United States Patent [19]

Welterlin

[11] Patent Number: 4,578,606
[45] Date of Patent: Mar. 25, 1986

[54] BRUSHLESS DC ELECTRIC MOTOR AND TACHOGENERATOR ASSEMBLY

[75] Inventor: Raymond E. Welterlin, Cary, N.C.

[73] Assignee: Buehler Products, Inc., Raleigh, N.C.

[21] Appl. No.: 681,271

[22] Filed: Dec. 13, 1984

[51] Int. Cl.⁴ .......................................... H02K 11/00
[52] U.S. Cl. .................. 310/68 R; 310/268; 310/156; 318/254
[58] Field of Search ............ 310/68 R, 156, 268, 310/257; 318/254, 254 A, 138

[56] References Cited

U.S. PATENT DOCUMENTS

| | | | |
|---|---|---|---|
| 3,868,521 | 2/1978 | Schlicker | 310/257 |
| 4,174,484 | 11/1979 | Schmider | 310/68 R |
| 4,237,394 | 12/1980 | Aoki | 310/268 X |
| 4,260,920 | 4/1981 | Nakamura | 310/156 |
| 4,366,405 | 12/1982 | Schmider | 310/268 |
| 4,385,249 | 5/1983 | Fukushima | 310/68 R |
| 4,394,594 | 7/1983 | Schmider | 310/68 R |

Primary Examiner—Donovan F. Duggan
Attorney, Agent, or Firm—Mason, Fernwick & Lawrence

[57] ABSTRACT

A brushless, self-commutating DC motor including a tachogenerator for producing speed control signals, the motor having a cup-shaped housing fixed to an output shaft and carrying a cylindrical annular permanent magnet. The motor also includes a stator assembly having six rotor drive coils paired to provide a three phase driving coil system and a tachogenerator yoke and coil assembly forming part of the stator system. The rotor magnet has two tracks of multipolarization formed of an outer track of a plurality of driving magnetic poles and an inner track of tachogenerator magnetic poles of a greater number than the driving poles.

15 Claims, 5 Drawing Figures

BRUSHLESS DC ELECTRIC MOTOR AND TACHOGENERATOR ASSEMBLY

BACKGROUND AND OBJECTS OF THE INVENTION

The present invention relates in general to electric motors having an electronic commutator and a frequency generator or tachogenerator providing a signal used in the speed control of the motor and more particularly to tachogenerator construction for such electric motors to provide the signals used for speed control.

The invention in general relates to direct drive brushless motors and associated control systems for providing high accuracy speed control of the motors, for use for example on floppy discs and similar applications. In general, the brushless motor includes a permanent field magnet secured to a rotor, the magnet being magnetized with regularly arranged magnetic poles of alternating polarity, together with a stator having a plurality of driving coils interlinked with the magnetic charges of the magnet. A speed detecting coil is disposed in the field of the magnet having a voltage induced by the magnetic poles. The typical prior art approach has been to create a tachometer output signal by such an arrangement which presents a high frequency. This frequency is proportional to the revolution speed of the rotor. Any change in the moving speed of the rotor would cause a frequency modulation that can be transformed into a voltage modulation through an analog speed control circuit which is able to adjust the input power to the motor in order to keep the speed constant. The analog circuit converts the frequency into a voltage affected by a certain amount of ripple which needs to be averaged in order to provide a DC voltage output. The frequency of the tachometer must be at least 10–20 times the highest frequency response desired in order to provide enough accuracy to the speed control of the motor. However, the high frequency system has certain shortcomings. Notable among these are that the high frequencies are generated by additional provision of a magnet on the rotor outside diameter which substantially increases the size of the motor. Also it is costly to produce a high frequency tachometer with no real benefit because the averaging operation slows down the response of the speed control.

The electric motor herein described is designed to provide an economic method of controlling the commutation and the speed of the motor by using a minimum amount of motor built-in sensors, which are connected to a digital signal processing circuit. The digital processing circuit is designed to maintain the speed of the motor to a predetermined value with a high accuracy such as is required in data processing equipment for floppy discs and the like. The electric motor with the novel tachogenerator structure of the present invention is designed to provide a low frequency signal to a digital control circuit which can maintain a high degree of accuracy in controlling speed because it uses a low frequency tachometer that has a low jitter content and updates the speed after each tachometer input without averaging. Thus the digital circuit measures the time between the tachometer inputs very accurately and performs better with a lower frequency and lower jitter signal, so that the calculation time is negligible when compared to the sampling rate and the jitter does not induce errors into the feed-back loop. Such low frequency tachometer signals are inexpensive and simple to generate in the motor.

In typical tachogenerators used in prior art, one conventional type of structure uses a tachometer that extends around the outer periphery of the motor. In this arrangement, the motor magnet is an annular structure arranged above the motor coil concentric with a common vertical axis, with an inverted cup shaped structure fixed to the motor magnet, supporting an annular tachometer magnet which encircles the periphery of the motor and is disposed over the conductor pattern of the tachometer coil. Other prior art, for example FIG. 1 of U.S. Pat. No. 4,385,249, shows a tachogenerator that extends on the side of the motor with the tachometer coil extending in a concentric path around the tachometer magnet mounted on the rotor shaft and located substantially midway between the axis of the shaft and the perimeter of the motor. Still another version is shown in FIG. 2 of U.S. Pat. No. 4,385,249, which employs the tachogenerator formed of the coil and rotatable tachometer magnet located inside the center or opening of the annular motor magnet. Still another version shown in U.S. Pat. No. 4,109,170 employs a tachogenerator that is inserted between the magnet and the coils and therefore decreases motor torque. A similar version of this structure is shown on FIG. 1 of U.S. Pat. No. 4,260,920 where the tachometer poles are magnetized on the outer periphery of the motor, thus further reducing the motor torque as will be explained in the detailed description.

The above arrangements have certain drawbacks which have now been recognized. They involve added costs due to the use of two separate magnets which must be assembled on the rotor, and usually increase overall motor dimensions. They provide poor motor performance in the case of a tachogenerator involving only the main magnet since necessitating a large air gap between the magnet and the motor coils to insert the tachogenerator coil.

An object of the present invention is the provision of a low speed direct drive brushless motor, for floppy discs and similar data processing applications, having a novel tachogenerator structure wherein the magnet of the motor is magnetized with two tracks of multipolar magnetization, providing a main portion disposed in an annular path around the outer portion of the magnet magnetized to provide the motor poles, and a small track extending in an annular path along the inner circumference, avoiding the drawbacks of the above described prior art structures. The inner magnetized track providing the poles for the tachogenerator operation does not bring effective magnetic charges which would interfer with the flux created by the coils to generate torque and is magnetized with a predetermined number of poles that is higher than the number of motor poles, creating the rotor portion of the tachogenerator. The stator portion of the tachogenerator is provided with an equal number of poles as the magnetic poles on the inner track of the magnet. The equal number of poles on the rotor magnet and the stator creates an averaged induced alternating signal which has very low jitter or frequency variation. Thereby, the desired low frequency tachogenerator signal is produced having a low jitter content, which can be processed by a digital control circuit to measure the time between the tachometer inputs very accurately and wherein the calculation time is negligible when compared to the sampling rate, such that jitter does not induce errors into the signal processing.

Other objects, advantages, and capabilities of the present invention will become apparent from the following detailed description, taken in conjunction with the accompanying drawings illustrating a preferred embodiment of the invention.

DETAILED DESCRIPTION OF A PREFERRED EMBODIMENT

Figure 1:
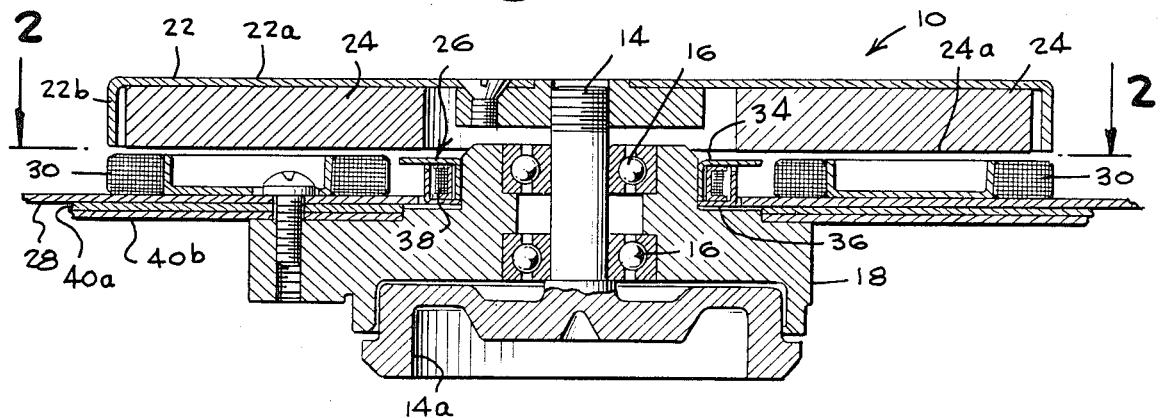
FIG. 1 is a vertical cross sectional view of a direct drive brushless motor and tachogenerator assembly constructed in accordance with the present invention.
Figure 2:
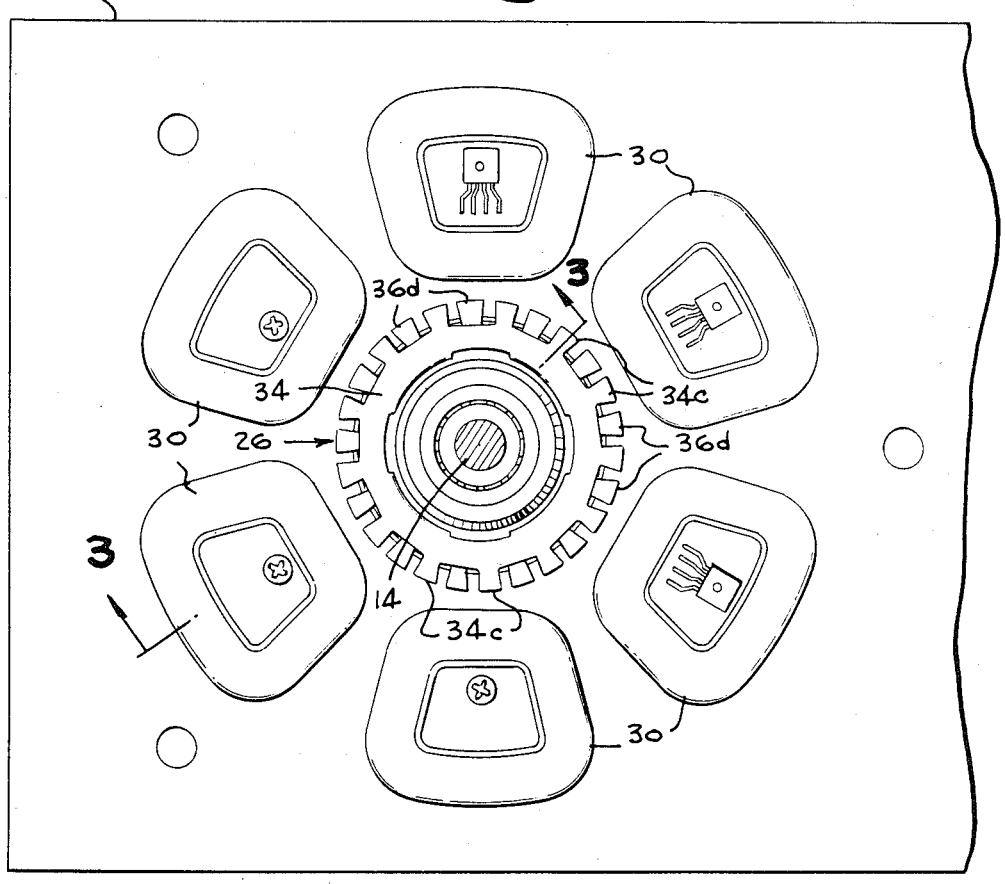
FIG. 2 is a section view thereof taken along a plane transverse to the motor shaft axis, along the line 2—2 of FIG. 1.

Referring to the drawings, wherein like reference characters designate corresponding parts throughout the several figures, the low speed direct drive brushless motor of the present invention is indicated generally by the reference character 10 and comprises a rotor 12 including a drive shaft 14, supported by ball bearing assemblies 16 for rotation about the axis of the drive shaft 14 supporting the drive shaft for rotation from the shaft support member 18 of the configuration shown in FIG. 1. The rotor shaft 14 is coupled to the computer disc or other equipment's rotating device to transmit torque from the rotor shaft 14 in a known manner, for example by the spindle member 14a. The motor is of a configuration sometimes referred to as a pancake design, wherein the disc-like rotor 12 is formed of a substantially cup-shaped housing member 22 having a thin circular flat top or main body portion 22a and a depending integrally joined cylindrical peripheral skirt or side 22b in the orientation shown in FIG. 1, surrounding an annular or ring shaped permanent magnet 24. The magnet 24 has a rectangular cross sectional configuration and is fixed to the cup-shaped housing 22, and has a radially directed lower annular surface 24a in a plane perpendicular to the axis of the motor shaft 14.

A stator back iron plate composed of two sheets 40a and 40b and shaped thin printed circuit board panel 28 are fixed to the shaft support member 18 and have a plurality of driving coils 30 mounted on the upper surface thereof in a plane parallel to the annular surface 24a of the permanent magnet. In the illustrated embodiment, six driving coils 30 are provided, connected in series, the coils 30 being grouped by two and forming a 3 phase delta configuration. The three groups of coils are angularly shifted with respect to each other by an angle of 120 degrees to insure proper operation of a multiphase motor. Accordingly, magnetic fluxes are produced around the copper wire forming the coils 30, which exert a force on the magnetic charges provided by the poles on the surface 24a of the magnet, as later described, so as to impart to the latter a torque effective to rotate the magnet 24 and rotor 12 in one direction.

Figure 4:
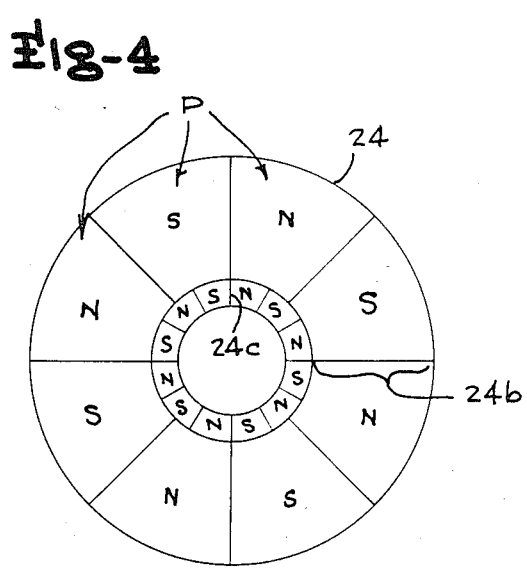
FIG. 4 is a diagramatic view of the annular magnet magnetized to provide the two tracks of multipolar magnetization in accordance with the present invention.

The magnet 24 of the present invention has a novel arrangement providing two tracks of multi-polar magnetization, as indicated diagramatically in FIG. 4. The main and outer portion of the magnet 24 is indicated by the reference character 24b in FIG. 4 and is magnetized with the motor poles, here illustrated diagramatically as eight alternate north (N) and south (S) magnet poles (P), which are employed in the preferred embodiment. The small portion of the inner circumference of the annular magnet 24, which does not introduce effective magnet charges that would interfere with the flux created by the motor coils 30 to generate torque, forms an inner track indicated at 24c which is magnetized with the number NP of poles that is higher than the number of motor poles (P) and creating the motor portion of the tachogenerator. Both tracks 24b and 24c are magnetized axially.

In the illustrated embodiment, there are twenty six to fifty poles on the track 24c at the portion of the inner circumference of the magnet 24 reserved for the tachogenerator, and eight magnet poles (P) in the outer track 24b for interaction with the motor coils 30. The stator portion of the tachogenerator, indicated generally by the reference character 26, comprises upper and lower yokes, indicated at 34 and 36, made of soft magnetic material having a total of NP poles (that is, an equal number of poles to the poles on the inner track 24c of the magnet) and a surrounding coil 38. The poles formed by the stator yokes 34, 36, are oriented radially and the outer diameter of the poles corresponds to the outer diameter of the inner track 24c of the magnet.

Figure 3:
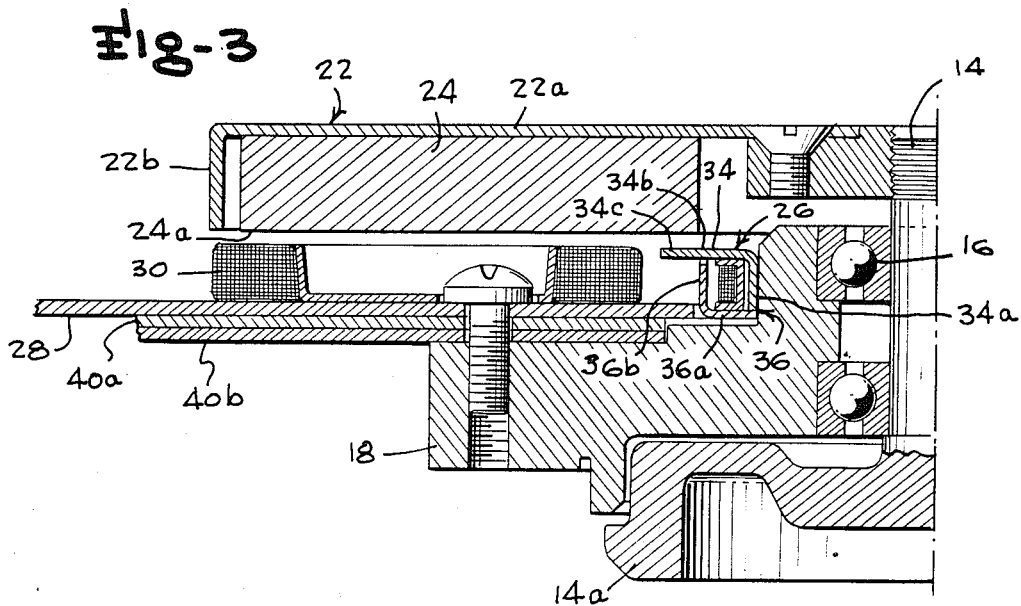
FIG. 3 is a vertical half section view, to larger scale, of one embodiment of the tachogenerator showing the relative locations of the rotor magnet and stator coil structure in greater detail, taken along line 3—3 of FIG. 2.
Figure 5:
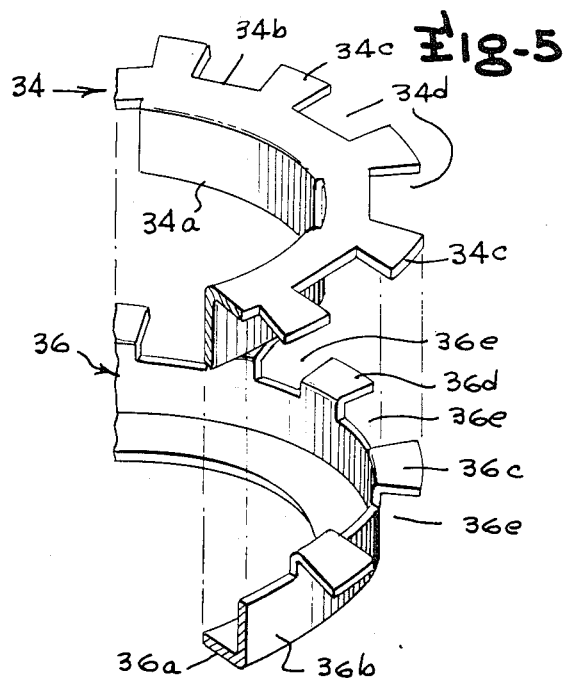
FIG. 5 in a fragmentary sectional exploded perspective view of the yoke construction for the tachogenerator coil for one particular embodiment thereof.

The assembly of upper and lower yokes for the tachogenerator coil assembly may take the preferred form illustrated in FIGS. 3 and 5, in which the upper annular yoke 34 is of L-shaped radial cross-section and has cylindrical tubular inner wall portion 34a fixed against the upper portion of support 18 and an annular flange portion 34b having a series of teeth 34c alternating with recesses 34d. The lower yoke 36 of the tachogenerator stator assembly is Z-shaped in radial cross-section and has an annular flange or disc portion 36a joined at its inner diameter edge to the tubular wall portion 34a of the upper yoke member 34 and a portion of inverted L-shaped radial cross-section defining a cylindrical tubular skirt portion 36b concentric with and outwardly encircling the cylindrical wall portion 34a and coil 38 and an annular flange formation 36c extending radially outwardly off the upwardly extending tubular shaped skirt portion 36b of the lower yoke 36 interrupted to provide a series of alternating L-shaped teeth 36d alternating with intervening L-shaped recesses 36e. The upwardly projecting axially oriented portions of the L-shaped teeth 36d end substantially flush with the top surface of the upper yoke disc portion 34a and are disposed to extend within the recesses 34d of the upper yoke 34.

As the magnet rotates, the magnetic flux generated by the alternating north and south poles in the inner tachogenerator pole track 24c of the magnet 24, located in the preferred embodiment in the region immediately adjacent the surface 24a of the magnet 24, rotates and intersects the teeth 34c, 36d, of the stator portion 32 of the tachogenerator, inducing an alternating flux path through the armature or core formed by the yokes 34, 36. The tachogenerator coil 38 detects these changes in flux densities and generates tachogenerator signals of voltage to be processed to control the commutation of the motor and maintain the desired speed accuracy. The frequency of the signal generated in the tachogenerator coil 36 corresponds to the number of revolutions per second, multiplied by the number N of pairs of tachogenerator poles in the track 24c of the magnet 24. Thus the output signal of the tachogenerator coil 36 is proportional to the the speed of revolution of the magnet 24. These signals are applied to digital circuitry provided on the printed circuit board 28 to appropriately regulate the supply to the driving coils 30, providing a low frequency tachometer signal compared to the high frequency signals previously employed for such motor control, which has a low jitter content and can therefore be employed without averaging to provide digital circuit control which can maintain a high degree of accuracy in controlling speed and does not substantially increase the size of the motor.

As is shown in FIGS. 1 and 3, a pair of thin panels or sheets 40a, 40b in abutment with each other and with the PC panel 28 are provided immediately beneath the panel 28. These panels or sheets 40a, 40b are of silicon steel and each have a circular center opening of corresponding size receiving a circular boss or shoulder formation of the support member 18, the inner edges 41 of the steel panels 40a, 40b bounding the center openings being located in line with the outer tips of the teeth 34c, 36d of the yokes 34, 36, to force the flux of the coils 30 to go straight into the air gap and not bend into the area where the tachogenerator is which would cause noise and jitter in the tachogenerator signal.

By the arrangement of the present invention, the speed detecting poles are provided on the inner periphery 24c of the magnet 24 and the outer peripheral portions 24b of the magnet are employed for the driving poles providing significant advantages. Mathematical analysis of the torque equation for such motors having an annular magnet wherein the outer diameter has a radius $R_2$ and the inner diameter has a radius $R_1$ show that the torque is largely a function of the outer perimeter radius $R_2$. The motor torque constant dependency on the radius $R_2$ can theoretically be approximated by a power curve such as torque constant $= a.R_2^{2.8}$ where a is a coefficient depending on other geometrical parameters. Thus the outer perimeter radius $R_2$ is very effective in creating torque, whereas the radius $R_1$ at the inner cylindrical boundry of the annular magnet is not. It is therefore advantageous to use the inner portion of the magnet adjacent the edge of radius $R_1$ for speed detecting poles, so that the outer portion of the magnet can be fully used to create torque. This provides for a more efficient electric motor. It is possible to magnetize the speed detecting poles on the inner portion or track 24c of the magnet and still have a larger number of speed detecting poles than the number of driving magnetic poles in the outer larger track 24b, but the physical limit of the poles and the inner track 24c is smaller than it would be if the rotor portion of the tachogenerator would be disposed near the outside diameter of the magnet 24. In order to compensate for the lower number of speed detecting poles in the track 24c, the stator portion 32 of the tachogenerator is provided with an equal number of poles as the magnetic poles on the inner track 24c of the magnet. The equal number of poles on the rotor magnet 24 and the stator 26 creates an averaged induced AC signal which compensates for all small mechanical irregularities in the tachogenerator and thus has very low jitter or frequency variation.

This permits use of a digital speed control using a Ramp-Sample-Hold approach which is accurate enough to fully use the low jitter of the speed detecting AC signal and to accommodate for the lower frequency. A compact construction is provided as the speed detection coil 38 and it's associated upper and lower yoke 34 and 36 are physically located within the motor air gap and the space in the region encircled by the driving coils 30, although the speed detection coil does not use the field in the air gap. The speed detecting coil 38, as previously described, has it's own magnetic circuit provided by the upper yoke 34 and lower yoke 36 of the stator.

While one particular embodiment of the present invention has been specifically shown and described, it will be apparent to those skilled in the art that other modifications in the specific configuration of the stator armature or yoke assembly and in the magnetization of the magnet 24 may be employed and it is intended that these are embraced within the scope of the invention herein described.

I claim:

1. A brushless, self-commutating DC motor for driving computer discs, electronic equipment disc records and the like and including a tachogenerator for producing speed control signals of low frequency and of low jitter, comprising a disc-like motor including a rotor having a generally cup-shaped housing, an output drive shaft fixed to said housing, and a cylindrical annular permanent rotor magnet carried by said housing concentric with a center axis of rotation of the housing providing a center hole concentric with said axis, a stator assembly including a stator support member and a plurality of rotor drive coils and a speed signal generating coil assembly supported thereby, means journalling said output drive shaft and rotor including said drive coils on said stator support member, the annular rotor magnet having two tracks of multipolarization formed of an outer annular circular track over the major radial extent thereof having a plurality of driving magnetic poles segmented circumferentially of the rotor magnet of alternating polarity and an inner annular circular track of tachogenerator magnetic poles of a greater number than the driving poles segmented circumferentially of the rotor and located immediately adjacent the inner cylindrical boundary of the annular rotor magnet, and the signal generating coil assembly including stator coil means and yoke means of soft magnetic material coupled magnetically with the flux lines produced by said tachogenerator magnetic poles for producing tachogenerator signals of low frequency having a low jitter content to be processed by digital control circuitry for controlling the speed of the motor.

2. A brushless DC motor and tachogenerator assembly as defined in claim 1 wherein the rotor drive coils of the stator assembly are formed of six coils paired to provide a three phase driving coil system.

3. A brushless DC motor and tachogenerator assembly as defined in claim 1 wherein the rotor drive coils of the stator assembly are formed of six coils paired to provide a three phase delta configuration driving coil system having angular spacing of 120 degrees between the three pairs of coils.

4. A brushless DC motor and tachogenerator assembly as defined in claim 1 wherein the soft magnetic material of the yoke means of the stator portion of the tachogenerator have a number of poles equal to the poles on the inner track of the rotor magnet.

5. A brushless DC motor and tachogenerator assembly as defined in claim 1 wherein the soft magnetic material of the yoke means of the stator portion of the tachogenerator have a number of poles equal to the poles on the inner track of the rotor magnet and the poles formed by the stator yokes are oriented radially with their outer diameter edge portions corresponding to the outer diameter of the inner annular circular track of tachogenerator magnetic poles on the magnet.

6. A brushless DC motor and tachogenerator assembly as defined in claim 2 wherein the soft magnetic material of the yoke means of the stator portion of the tachogenerator have a number of poles equal to the poles on the inner track of the rotor magnet.

7. A brushless DC motor and tachogenerator assembly as defined in claim 2 wherein the soft magnetic material of the yoke means of the stator portion of the tachogenerator have a number of poles equal to the poles on the inner track of the rotor magnet and the poles formed by the stator yokes are oriented radially with their outer diameter edge portions corresponding to the outer diameter of the inner annular circular track of tachogenerator magnetic poles on the magnet.

8. A brushless DC motor and tachogenerator assembly as defined in claim 3 wherein the soft magnetic material of the yoke means of the stator portion of the tachogenerator have a number of poles equal to the poles on the inner track of the rotor magnet.

9. A brushless DC motor and tachogenerator assembly as defined in claim 3 wherein the soft magnetic material of the yoke means of the stator portion of the tachogenerator have a number of poles equal to the poles on the inner track of the rotor magnet and the poles formed by the stator yokes are oriented radially with their outer diameter edge portions corresponding to the outer diameter of the inner annular circular track of tachogenerator magnetic poles on the magnet.

10. A brushless DC motor and tachogenerator assembly as defined in claim 1, wherein said yoke means for the tachogenerator coil assembly comprise upper and lower yoke members of soft magnetic material having annular upper and lower disc portions lying in parallel planes perpendicular to said center axis with a generally circular outer perimeter on the upper yoke formed of a series of square waved shaped teeth alternating with square wave shaped recesses and a generally circular outward flange extension of the lower yoke formed of a series of L-shaped teeth alternating with L-shaped recesses such as the radially oriented portions of the L-shaped teeth are substantially flush with the top surface of the upper yoke disc.

11. A brushless DC motor and tachogenerator assembly as defined in claim 2, wherein said yoke means for the tachogenerator coil assembly comprise upper and lower yoke members of soft magnetic material having annular upper and lower disc portions lying in parallel planes perpendicular to said center axis with a generally circular outer perimeter formed of a series of square waved shaped teeth alternating with square wave shaped recesses and a generally circular outward flange extension of the lower yoke formed of a series of L-shaped teeth alternating with L-shaped recesses such as the radially oriented portions of the L-shaped teeth are substantially flush with the top surface of the upper yoke disc.

12. A brushless DC motor and tachogenerator assembly as defined in claim 3, wherein said yoke means for the tachogenerator coil assembly comprise upper and lower yoke members of soft magnetic material having annular upper and lower disc portions lying in parallel planes perpendicular to said center axis with a generally circular outer perimeter formed of a series of square waved shaped teeth alternating with square wave shaped recesses and a generally circular outward flange extension of the lower yoke formed of a series of L-shaped teeth alternating with L-shaped recesses such as the radially oriented portions of the L-shaped teeth are substantially flush with the top surface of the upper yoke disc.

13. A brushless DC motor and tachogenerator assembly as defined in claim 5, wherein said yoke means for the tachogenerator coil assembly comprise upper and lower yoke members of soft magnetic material having annular upper and lower disc portions lying in parallel planes perpendicular to said center axis with a generally circular outer perimeter formed of a series of square waved shaped teeth alternating with square wave shaped recesses and a generally circular outward flange extension of the lower yoke formed of a series of L-shaped teeth alternating with L-shaped recesses such as the radially oriented portions of the L-shaped teeth are substantially flush with the top surface of the upper yoke disc.

14. A brushless DC motor and tachogenerator assembly as defined in claim 7, wherein said yoke means for the tachogenerator coil assembly comprise upper and lower yoke members of soft magnetic material having annular upper and lower disc portions lying in parallel planes perpendicular to said center axis with a generally circular outer perimeter formed of a series of square waved shaped teeth alternating with square wave shaped recesses and a generally circular outward flange extension of the lower yoke formed of a series of L-shaped teeth alternating with L-shaped recesses such as the radially oriented portions of the L-shaped teeth are substantially flush with the top surface of the upper yoke disc.

15. A brushless DC motor and tachogenerator assembly as defined in claim 9, wherein said yoke means for the tachogenerator coil assembly comprise upper and lower yoke members of soft magnetic material having annular upper and lower disc portions lying in parallel planes perpendicular to said center axis with a generally circular outer perimeter formed of a series of square waved shaped teeth alternating with square wave shaped recesses and a generally circular outward flange extension of the lower yoke formed of a series of L-shaped teeth alternating with L-shaped recesses such as the radially oriented portions of the L-shaped teeth are substantially flush with the top surface of the upper yoke disc.

* * * * *